US012008708B2

United States Patent
Wick et al.

(10) Patent No.: US 12,008,708 B2
(45) Date of Patent: Jun. 11, 2024

(54) METHOD AND DATA PROCESSING SYSTEM FOR CREATING OR ADAPTING INDIVIDUAL IMAGES BASED ON PROPERTIES OF A LIGHT RAY WITHIN A LENS

(71) Applicant: Carl Zeiss AG, Oberkochen (DE)

(72) Inventors: Michael Wick, Coburg (DE); Christian Wojek, Aalen (DE); Vladan Blahnik, Oberkochen (DE); Torsten Sievers, Heidenheim (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 17/159,506

(22) Filed: Jan. 27, 2021

(65) Prior Publication Data

US 2021/0150804 A1    May 20, 2021

Related U.S. Application Data

(63) Continuation of application No. PCT/EP2019/070332, filed on Jul. 29, 2019.

(30) Foreign Application Priority Data

Jul. 27, 2018  (DE) .................... 10 2018 118 187.6

(51) Int. Cl.
*G06T 15/50*    (2011.01)
*G06T 15/20*    (2011.01)

(52) U.S. Cl.
CPC .......... *G06T 15/503* (2013.01); *G06T 15/205* (2013.01); *G06T 15/506* (2013.01)

(58) Field of Classification Search
CPC .... G06T 15/506; G06T 15/205; G06T 15/503
See application file for complete search history.

(56) References Cited

U.S. PATENT DOCUMENTS

| | | | |
|---|---|---|---|
| 5,990,935 A | 11/1999 | Rohlfing | |
| 6,268,863 B1 * | 7/2001 | Rioux ..................... | G06T 15/00 345/426 |

(Continued)

FOREIGN PATENT DOCUMENTS

| | | |
|---|---|---|
| DE | 19815106 A1 | 10/1998 |
| EP | 3291532 A1 | 3/2018 |

(Continued)

OTHER PUBLICATIONS

B. Steinert et al, "General Spectral Camera Lens Simulation", Computer Graphics Forum, vol. 30, No. 6, Mar. 1, 2011 (Mar. 1, 2011).

(Continued)

*Primary Examiner* — King Y Poon
*Assistant Examiner* — Vincent Peren
(74) *Attorney, Agent, or Firm* — Ewers IP Law PLLC; Falk Ewers (57) ABSTRACT

A method for creating a second series of individual images with a first series of individual images, the individual images of the first or the second series of individual images having been captured with an objective, includes determining the entrance pupil and the field of vision of the objective for the individual images of the first series and creating or adapting the individual images of the second series in accordance with the entrance pupil and the field of vision of the objective of the individual image in question of the first series.

14 Claims, 4 Drawing Sheets

(56) References Cited

U.S. PATENT DOCUMENTS

| | | | |
|---|---|---|---|
| 7,463,292 B2 | 12/2008 | Sasaki | |
| 10,692,288 B1* | 6/2020 | Rasmussen | A63F 13/213 |
| 2005/0168485 A1* | 8/2005 | Nattress | H04N 5/222 |
| | | | 348/E5.022 |
| 2009/0102841 A1 | 4/2009 | Clavadetscher | |
| 2015/0279113 A1 | 10/2015 | Knorr et al. | |
| 2017/0155881 A1 | 6/2017 | Mikawa et al. | |
| 2017/0302868 A1* | 10/2017 | Hiasa | G06T 5/002 |
| 2019/0392628 A1* | 12/2019 | Connell | G06T 15/506 |

FOREIGN PATENT DOCUMENTS

| | | |
|---|---|---|
| JP | 2004227332 A | 8/2004 |
| JP | 2005252680 A | 9/2005 |
| WO | 2013082539 A1 | 6/2013 |

OTHER PUBLICATIONS

Adrian Carrio et al, "SIGS: Synthetic Imagery Generating Software for the Development and Evaluation of Vision-based Sense-And-Avoid Systems", Oct. 31, 2015 (Oct. 31, 2015).

Office Action issued in German Patent Application No. DE 10 2018 118 187.6, dated Oct. 5, 2019 (from which this application claims priority) and English language translation thereof.

Written Opinion and International Search Report dated Oct. 30, 2019 of international application PCT/EP2019/070332 on which this application is based and English language translation thereof.

Craig Kolb et al, "A Realistic Camera Model for Computer Graphics", SIGGRAPH 95 Conference Proceedings : Aug. 6-11, 1995, [Los Angeles, California]; [Computer Graphics Proceedings (SIGGRAPH)], ACM, New York, NY, USA, Sep. 15, 1995 (Sep. 15, 1995).

W. Heidrich et al, "An Image-Based Model for Realistic Lens Systems in Interactive Computer Graphics", Proceedings of Graphics Interface '97. Kelowna, British Columbia, May 21-23, 1997; [Proceedings of Graphics Interface], Toronto, Cips, CA,vol. Conf. 23, May 21, 1997 (May 21, 1997).

Office Action dated Mar. 14, 2023 issued in Japanese counterpart application No. 2021-503548 and English-language translation thereof.

Office Action issued in Korean counterpart Patent Application No. KR 10-2021-7005518, dated Sep. 1, 2023, and English language translation thereof.

* cited by examiner

METHOD AND DATA PROCESSING SYSTEM FOR CREATING OR ADAPTING INDIVIDUAL IMAGES BASED ON PROPERTIES OF A LIGHT RAY WITHIN A LENS

CROSS REFERENCE TO RELATED APPLICATIONS

This application is a continuation application of international patent application PCT/EP2019/070332, filed Jul. 29, 2019, designating the United States and claiming priority to German application 10 2018 118 187.6, filed Jul. 27, 2018, and the entire content of both applications is incorporated herein by reference.

TECHNICAL FIELD

The disclosure relates to a method for creating a second series of individual images with a first series of individual images, wherein the individual images of the first series of individual images were recorded with the aid of a lens. In particular, the disclosure relates to a software-based method for modifying and/or creating moving images on the basis of predefined parameters.

BACKGROUND

Animations for example for feature films, computer games, medical imaging, security applications for face recognition, in computer-based simulations, in virtual reality applications or in industrial metrology are generated nowadays with image synthesis, also called rendering. One technique employed here, for example, provides for calculating the virtual ray path from a virtual sensor point through a virtual pinhole camera stop into a virtual three-dimensional scene and for assigning to the sensor point the corresponding color and intensity depending on the point of incidence in the virtual scene.

There is often a desire to superimpose or combine film sequences generated by this form of image synthesis with scenes filmed in reality. In other words, an image sequence having image contents generated as described, said image sequence showing for example virtual, computer-animated living organisms or backgrounds, is intended to be embedded for example into an image sequence filmed in reality, showing for example a studio situation with real actors.

What is endeavored in this case is that the image contents that are to be embedded into the real image sequence be integrated as seamlessly as at all possible. Depending on the image content, it is not necessarily important here to suggest to the viewer that real content is actually involved, rather the intention is to give the impression that the entire image content arose natively without postprocessing. Giving this impression currently means making a great effort, primarily including image-by-image manipulations in postproduction. In this case, with image processing programs, changes are made to individual image contents with the aim of fitting them as well as possible into the scenery filmed in reality. These processes of image postprocessing have to be performed manually for the most part and are based on empirical values. For a convincing visual experience, it is crucial that the special effects included by modeling blend as it were with the real image content and the viewer does not perceive any discontinuity. The settings (field of view (FoV), aperture, entrance pupil, location, focal length, etc.) applicable to the corresponding situation are simulated with physical models.

SUMMARY

It is an object of the present disclosure to provide a method for creating a second series of individual images with a first series of individual images which satisfies the requirements mentioned above, yields a higher degree of seamless integration, and at the same time requires less manual effort.

This object is achieved with a method for creating a second series of individual images with a first series of individual images as described herein. The method according to an aspect of the disclosure for creating a second series of individual images with a first series of individual images, wherein the individual images of the first or second series of individual images were recorded with the aid of a lens, includes the steps of determining the properties of a light ray within the lens for the individual images of the first series and creating or adapting the individual images of the second series taking account of the properties of a light ray within the lens of the respective individual image of the first series.

Adapting the image content of the individual images of the second series can involve subsequently converting individual image sequences that have already been calculated or generated in some other way. In this case, by way of example, the individual images of the first series can be combined exactly with the images of the second series. Creating the individual images of the second series can involve creating the individual image sequence with a lens, that is to say capturing an image sequence in the conventional sense, or calculating an individual image sequence in the sense of image synthesis (rendering) on the basis of a virtual scene. In this case, by way of example, individual elements such as persons or objects, for example, can be extracted from the images of the second series and be integrated into the images of the first series.

In one exemplary embodiment, the step of determining the properties of a light ray within the lens includes determining the entrance pupil and the field of view of the lens for the individual images of the first series.

The step of determining the entrance pupil and the FoV of the lens makes it possible, when adapting or creating the image content of the individual images of the second series, to take account of the exact viewing direction, the field of view actually captured by the lens and the entrance pupil for calculating or converting the image content of the second series.

By way of example, the entrance pupil and/or the field of view may change slightly, but still noticeably, during a focusing process of the lens for adaptation to a different lens/motif distance. This effect becomes apparent, inter alia, as an alteration of the image segment and is also known as pumping ("focus breathing"). While this effect is hardly relevant in the case of individual capturings, it becomes apparent in the case of film sequences and poses a major challenge for the conventional procedure particularly during the subsequent insertion of simulated or virtual, i.e., calculated, image contents. By contrast, if the entrance pupil and the field of view are already taken into account during the calculation of the image contents to be added, the image contents can be combined in a significantly simpler way and above all largely without manual interventions.

One exemplary embodiment of the disclosure includes a step of combining the image content of a first series of individual images and the image content of a second series of individual images, wherein the combining includes adapting the image content of the individual images of the second series to the image content of the individual images of the first series or creating the individual images of the second series, in each case taking account of the entrance pupil and the field of view of the lens of the respective individual image of the first series. Since the second series of individual images has been generated or adapted with knowledge of the information regarding the location of the entrance pupil and the field of view of the lens, combining the two image sequences—for example superimposing the two image sequences or inserting an image content of the second individual image sequence into the image content of the first image sequence—is possible without relatively large adaptations.

A further exemplary embodiment of the disclosure provides for taking into account, during the step of adapting or creating the individual images, besides the entrance pupil and the field of view, a position of an exit pupil, a depth of field, vignetting, possibly including color-dependent vignetting, a distortion, a bokeh, a chromatic aberration, a focus, a position of lens elements within a lens, an aperture, an exposure duration, a color appearance and/or a reflection within the camera. The parameters mentioned can be taken into account individually or in any desired combination. Furthermore, other relevant parameters such as, for example, the position of light sources, the type of light source, the distribution and the intensity of shadows, motion blur, etc. can also be detected. In the case of the light source, by way of example, the spectral distribution of the light, the emission characteristic, the intensity of the radiation, etc., can be detected. The more properties of the lens or of the scene are available and taken into account during the step of adapting or creating, the better it is possible to adapt the image content of the second image sequence to that of the first image sequence.

If a sufficiently high number of the parameters mentioned are taken into account in the step of adapting or, in particular, creating the individual images, the viewer can be given the impression that the combined image sequence arose without subsequent combining.

One exemplary embodiment of the disclosure provides for the step of creating the individual images of the second series to include creating the individual images with rendering a virtual scene. This poses a frequent challenge and can be solved in a simple manner with detecting the location of the entrance pupil in the scene and the field of view of the lens for the individual images of the first series.

As an alternative thereto, in one exemplary embodiment of the disclosure, the step of adapting the individual images of the second series can be preceded by creating the individual images with a lens for a camera. The lens for the camera need not be the same lens used to record the first series of individual images. Rather, on the basis of the determination of the entrance pupil and the field of view, a conversion of the image content of the second individual image sequence can be performed in such a way that the first and second series of individual images can be combined without any problems.

One development of the disclosure provides for the step of determining to comprise recording one or more imaging parameters of the lens in the course of capturing the first series of individual images. The imaging parameters—such as indeed the entrance pupil, the field of view, etc.—thus detected for example for each individual image or for a plurality of individual images can be used when creating or adapting the second series of individual images. This reduces the effort for combining the first and second series of individual images. In this regard, during a so-called blue screen or green screen capturing, for example, in which actors or objects are recorded against a neutral (for example blue or green) background, the parameters used during this capturing can be detected, in particular also in a temporally resolved manner, and can be used when creating a virtual scene on the basis of this capturing. This affords the advantage that there is no need to carry out any subsequent calculations with regard to the settings possibly used, the image contents of the two individual image sequences can be combined in a simple manner and the end result appears very realistic/authentic.

One development of this embodiment provides for the imaging parameters of the lens to be used in real time for creating the individual images of the second series. This can be used for example to pass on a green screen/blue screen scene during production, i.e., capturing, in real time to a simulation computer, which carries out in real time the envisaged combination with image contents already prepared or with image contents currently calculated and displays the result on a display such as a monitor or an eyepiece, for example. Consequently, a corresponding blue screen/green screen capturing can be assessed and, if appropriate, corrected or repeated as early as in the course of production.

One exemplary embodiment of the disclosure provides for the step of determining the properties of a light ray to be effected for a first lens and the step of creating the individual images of the second series is effected additionally taking account of the properties of a light ray within a second lens. Consequently, by way of example, a first individual image sequence recorded by way of a first lens (for example a wide angle lens) can be converted into a second individual image sequence, which then gives the impression as though it had been recorded by way of a different lens (for example a telephoto lens).

One development of the disclosure provides for the step of determining to comprise recording a temporal series of imaging parameters. Consequently, in particular during a film capturing including the capturing of a succession of individual images in close chronological order, for all of the individual images or for a specific subset of the individual images, the parameters required for combination are detected and taken into account. By way of example, before shooting actually begins, the cameraman in a virtual scene with a virtually operating camera can play through a capturing in advance and thus plan the scene to be captured. This can be referred to as previsualization or previsualizing.

In this way, by way of example, different camera settings or different types of lens can be tried out and checked with regard to artistic aspects and/or possible technical implementability. Possible parameters that can be detected in a temporally resolved manner may be, for example, the position of the lens, the direction of the lens, the current settings with regard to focus, aperture and/or zoom. These recordings can be used in a later work step for planning a set.

Since the capturing time of a film is normally expensive and often limited, previsualization with rendering is employed in order to minimize the general costs. The advantage of previsualization is that a director, cameraman or visual effects (VFX) supervisor can experiment with different production and artistic direction use options such as lighting, camera positioning, camera movement and optical settings of the lens, e.g., focus section, focal length or depth of field, director's orientation and editing, without incurring significant costs for production. In projects with a larger budget, the directors work with actors in the visual effects department or in special rooms.

Previsualizations can add music, sound effects and dialogs in order to emulate the appearance of fully produced and edited scene sequences. They are most commonly used in scenes with stunts and special effects (such as chroma key). Digital videos, photography, hand-drawn art, clip art and 3D animations are combined during previsualization. Apart from in the film industry and photography, the use of rendering for previsualization can be used in building planning, cosmetic surgery or the positioning of medical implants.

In this context, the method according to an aspect of the disclosure, as just described, can additionally include planning a capturing of the first series of individual images on the basis of the recording of the temporal series of imaging parameters and/or capturing the first series of individual images using the recording of the temporal series of imaging parameters. This makes it possible, as already explained, to create image sequences with a high degree of preplanning with a capturing simulation that appears very realistic.

Furthermore, the disclosure relates to a data processing system including means for carrying out the method according to the disclosure, and to a computer program.

The disclosure makes it possible to use the optical design, that is to say the dimensions, properties and the location of the lens elements within a lens, in the simulation of a scene. As already explained, modern animations for feature films are generated with rendering. In this case, virtual rays are traced from a virtual sensor pixel through a virtual pin-hole camera stop into a virtual three-dimensional scene. The pixel then obtains a corresponding color and intensity, depending on where the ray impinges in the scene. With the present disclosure, the simple pinhole stop model is replaced by the ray tracing of an optical design program. This results in an extremely realistic simulation of the lens. In order to further increase the degree of reality, effects appertaining to physical optics can also be simulated besides or in addition to the ray tracing method. In this case, by way of example, the point spread function can be calculated with a diffraction integral.

One exemplary embodiment of the disclosure can consist in using a three-dimensional computer model of a film set for planning scenes (previsualization). In such a model, scenes to be filmed can for example be only roughly modelled and/or animated and it is possible to derive therefrom—proceeding from the desired scene—requirements in respect of actors, the camera (and the settings and positions thereof), the required equipment, scenery and/or special effects. Before shooting begins, the cameraman plans the capturing in a virtual scene with a virtual camera. By way of the realistic simulation of the camera, different camera settings can be tested here for example prior to actual shooting. In this regard, costs can be saved, unexpected situations can be identified, and scenes can thus be better planned. By way of example, the focus setting that is usually carried out manually can be practiced particularly in the case of fast-moving motifs or the suitability of specific types of lens (real or not yet realized prototypes) can be tested. Settings with regard to artistic aspects and technical implementability can also be tried out. By way of example, position, direction, focus, aperture, zoom setting can be stored in a temporally resolved manner during the simulation. This information is then used to plan the set. Optionally, these data can then be transmitted to an electronic controlled real camera and this sequence of settings can be played back on the real camera.

Another exemplary embodiment can include the partial or complete, photorealistic creation of film scenes on the basis of 3D models. It is possible to superimpose real film scenes with computer animated scenes, for example virtual living organisms in real sceneries and/or actors in virtual sceneries or combinations of both. So-called green screens are often used for this purpose. For the quality of the combination of real scenes with computer animations, it is important how well the lighting conditions, the motion blur, the color rendering, the noise, etc. in the model correspond to the capturing of the real scenery. Productions in which these modelled special effects do not blend with the scenery give the viewer immediately the impression of not looking professional enough. The modelling of the lens with a pin hole camera model takes account only of the (constant) focal length of the lens in a greatly simplified manner. Just the perspective reproduction of a scene depends on the location of the entrance and exit pupils and the change in focal length of the lens. In this case, these pupil locations are functions of the focusing distance and zoom setting that are individually dependent on the lens. The f-number is additionally important; it concomitantly determines the depth of field of the scene. Moreover, there are a number of lens parameters such as distortion, vignetting, color rendering deviations, chromatic aberrations, reflection dependencies, etc. Specifically, in the case of a green screen scene, for example, position, direction, focus setting, aperture setting and zoom setting can be stored in a temporally resolved manner during image capturing. These settings are used when creating the virtual scene. An authentic look and simple superimposition of the images may be mentioned as advantages.

Alternatively or additionally, in the case of a green screen scene, for example, position, direction, focus setting, aperture setting and zoom setting can be passed on during image capturing directly to a real-time simulation and both images can be superimposed in the eyepiece or superimposed on the display.

Overall, the disclosure enables a number of advantages to be realized, depending on the embodiment: Setting times of the camera can be shortened by creating beforehand the settings within a virtual scene. Entire camera capturings can be planned in advance and camera settings and alterations thereof can be recorded in a virtual camera and be reproduced on a real camera. The capturing quality of specific film capturings in particular for scenes that cannot be repeated arbitrarily often can be improved by prior training of the cameraman. During the capturing of a virtual scene, it is possible to produce the same impression as during the capturing of a real scene with an exact simulation of the real lens. Simulated scenes can be animated/generated with a real camera. It is possible to carry out virtual prototyping for a camera/lens which still really exists.

One exemplary embodiment of the disclosure provides for carrying out a 3D image simulation in the context of a computer program with stored and interpolated point spread function data. The method includes the steps of: determining a size, a shape and a location of the exit pupil of a lens for a selected group of image points; by way of example, a 2D point grid with a pitch of approximately 5.4 mm can be chosen for this; interpolating the size, shape and location of image points between the selected image points for other image positions; inputting an object space function; the object space function can be understood to mean a three-dimensional function of intensities depending on the distance relative to the entrance pupil of a lens; the object space function includes for example the spectral properties such as, for example, RGB data or grayscale data and/or the distance between object and entrance pupil (depth map); creating a point spread function by linking the object space function with a lens function that effects the assignment of object space and image space; in this way, the point spread function includes the optical design data of the lens, optionally including the coating data of individual or all optical elements in the lens; integrating the point spread function over object coordinates; integrating the point spread function over the shape of the exit pupil in order thus to take account of a wavefront deformation by the exit pupil; and generating a rendered object space.

Compensation for a digital aberration (distortion and/or shading, etc.) can additionally be effected in this exemplary embodiment.

A further exemplary embodiment of the disclosure provides for carrying out a 3D image simulation with data of an optical transfer function. The method includes the steps of: determining a size, a shape and a location of the exit pupil of a lens for a selected group of image points; by way of example, a 2D point grid with a pitch of approximately 5.4 mm can be chosen for this; interpolating a size, a shape and a location of image points between the selected image points for other image positions in order to obtain an exit pupil function; inputting an object space function; the object space function can be understood to mean a three-dimensional function of intensities depending on the distance relative to the entrance pupil of a lens; the object space function can be obtained from a combination of the wavelengths and an optical transfer function, for example; in order to obtain the optical transfer function, a convolution of the exit pupil function (autocorrelation) is carried out; calculating a continuous Fourier transformation from the object space function; integrating the product of optical transfer function and Fourier-transformed object space function over the exit pupil coordinates for a fixed wavelength; repeating the calculation over many wavelengths; integrating over the wavelengths over each color channel (spectral response function) and the spectral distribution of the light source; generating an image for each color channel (RGB); and superimposing the images for each color channel (RGB) in order to obtain a realistic image.

In the exemplary embodiments mentioned, the problem arises of carrying out a Fourier transformation for highly defocused object space points. This requires very high raster sampling of the exit pupil, for example 10 000×10 000 instead of 30×30. This is time-consuming and the runtimes are very high.

Accordingly, an alternative exemplary embodiment of the disclosure provides for carrying out ray tracing-based rendering of a 3D image simulation. The method is based on tracing the light rays incident in a lens back to the light source. The method includes the steps of: determining a size, a shape and a location of the exit pupil of a lens for a selected group of image points; by way of example, a 2D point grid with a pitch of approximately 5.4 mm can be chosen for this; interpolating the size, shape and location of image points between the selected image points for other image positions; calculating a ray direction; for example positioned within the boundary defined by the exit pupil; creating a ray function; the latter can for example represent a probability function and indicate the direction-dependent distribution of rays and link the input coordinates with the output coordinates, for example; for each input ray, from hundreds to several millions of output rays can emerge, depending on the rendering quality striven for; simulating all rays as far as the light source; integrating over the angle space of the light source and the distance to the light source for all discrete output rays; repeating the method for every input ray leading from the lens to the object; for example for 10 000 rays; integrating all output rays that arrive at the light source for all input rays; and generating an image.

BRIEF DESCRIPTION OF THE DRAWINGS

The disclosure will now be described with reference to the drawings wherein.

DESCRIPTION OF EXEMPLARY EMBODIMENTS

Figure 1A:
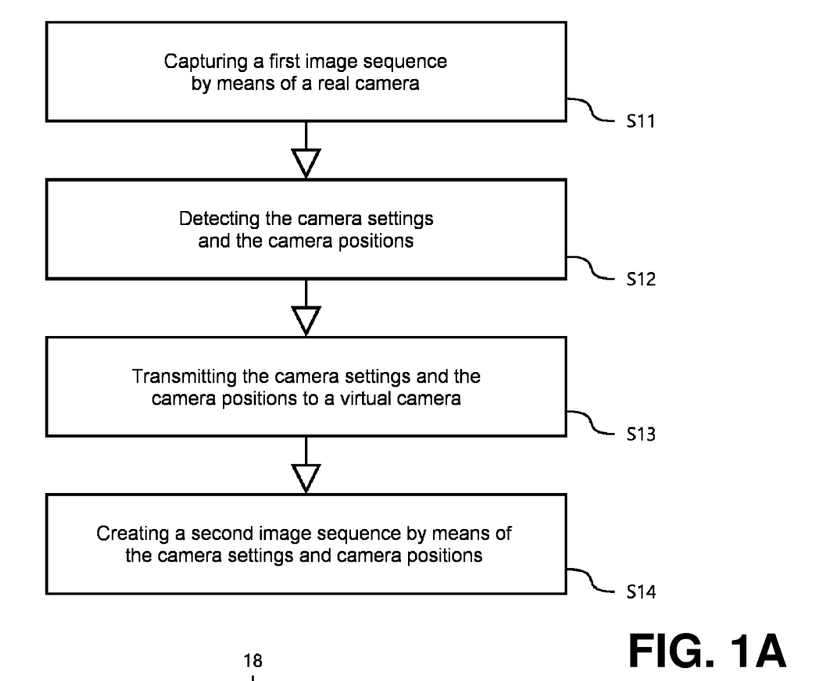
FIG. 1A shows a flow diagram of a first method according to an exemplary embodiment of the disclosure.
Figure 1B:
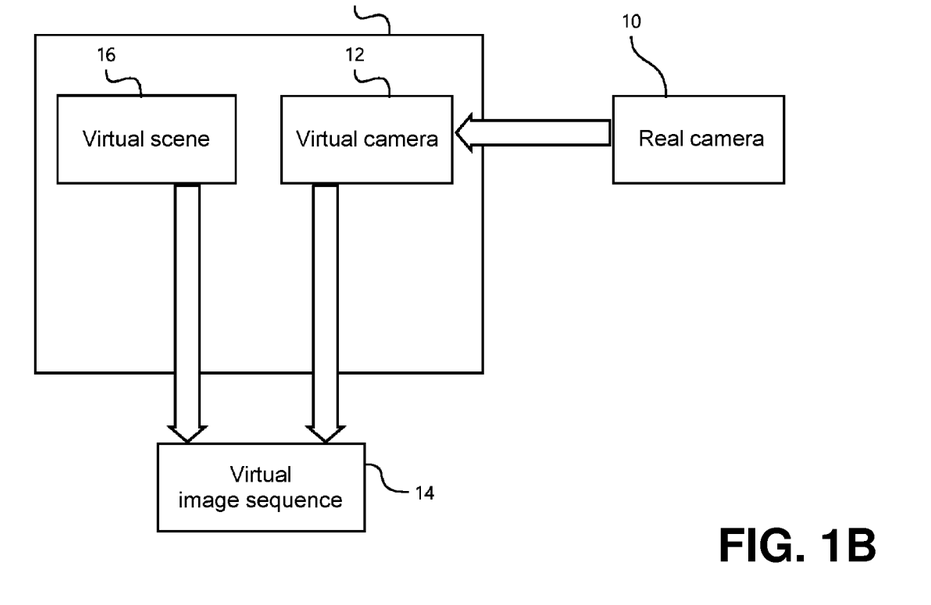
FIG. 1B shows a schematic illustration of the first method.

FIG. 1A, 1B represent a first method according to an exemplary embodiment of the disclosure for creating a second series of individual images with a first series of individual images. A first step S11 includes generating a first individual image sequence with a real camera 10. For the first method it is unimportant whether this first individual image sequence is actually stored. The individual image sequence can be stored, but it can also just be generated and not be recorded.

A second step S12 includes detecting the camera settings and the camera positions of the first image sequence. This is typically done during the generating of the image sequence, i.e., the capturing of the first image sequence with the real camera 10. If this is carried out during the capturing, the recording of the first image sequence can be omitted. The camera settings and camera positions can involve at least the position of the entrance pupil and the field of view of the capturing lens, but further parameters such as, for example, a stop/aperture, an exposure duration, a zoom setting, a focus, etc., can additionally be detected.

A further step S13 includes transmitting the camera settings and camera positions as data 11 to a virtual camera 12. This step, too, can be carried out after the first two steps S11, S12 or simultaneously therewith. The steps of capturing the first image sequence S11, detecting the camera settings and camera positions S12 and transmitting same S13 can thus be effected simultaneously or, given suitable buffer storage, also successively with a temporal offset. Accordingly, the transmission of the camera settings and camera position can be carried out.

The virtual camera 12 can be, for example, a parameter set for settings of an image synthesis program 18 that can generate a virtual image sequence 14, resulting from a virtual scene 16, in accordance with the further step S14 a second image sequence, with the camera settings and camera positions. The image synthesis program can be, for example, a calculation program that uses a ray tracing algorithm. With the data obtained from the real camera 10 and data possibly already known beforehand, a model of the camera 10 can be created in the image synthesis program. With this model—precisely the virtual camera 12—firstly lens-specific effects that are thus relevant to the optical imaging can be included. This enables a realistic simulation of the lens used or of the entire camera 10. Secondly, on the basis of an optionally also temporally resolved detection of the entrance pupil and the field of view, the movement of the real camera 10 and effects possibly also associated therewith such as the influence of lighting conditions at different locations or effects such as motion blur, color rendering or noise can have an influence on the generation of the virtual image.

In one specific configuration of this method, by way of example, a real camera 10 can be used as a controller of a virtual camera 12 for the generation of a virtual image sequence 14 within a virtual scene 16. In this way, a computer-animated scene can be generated in a simple manner.

Figure 2A:
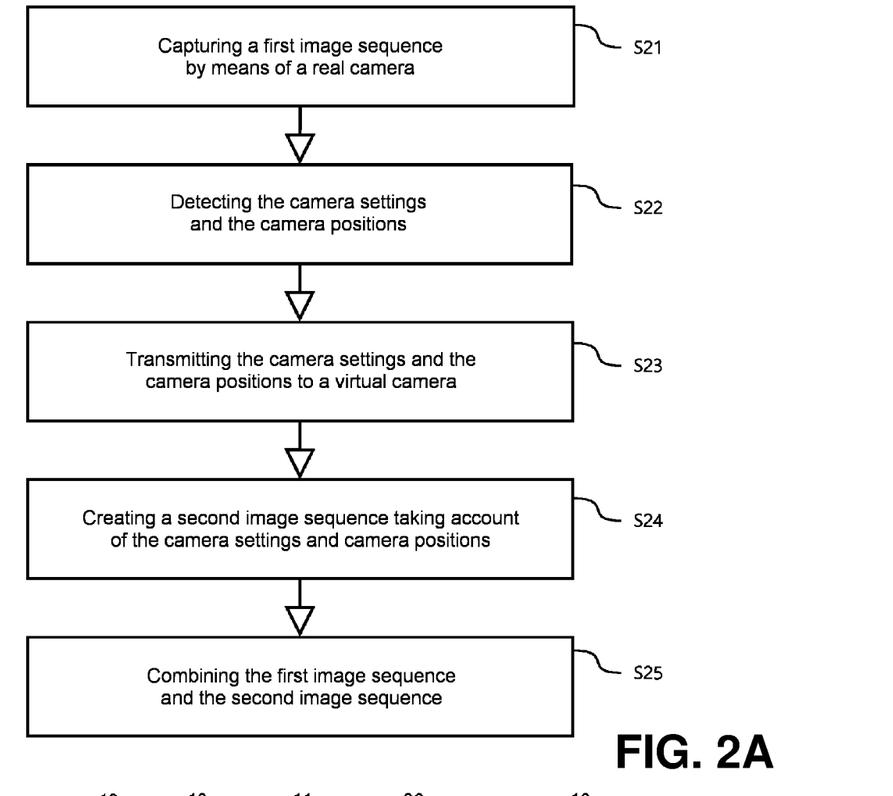
FIG. 2A shows a flow diagram of a second method according to an exemplary embodiment of the disclosure.
Figure 2B:
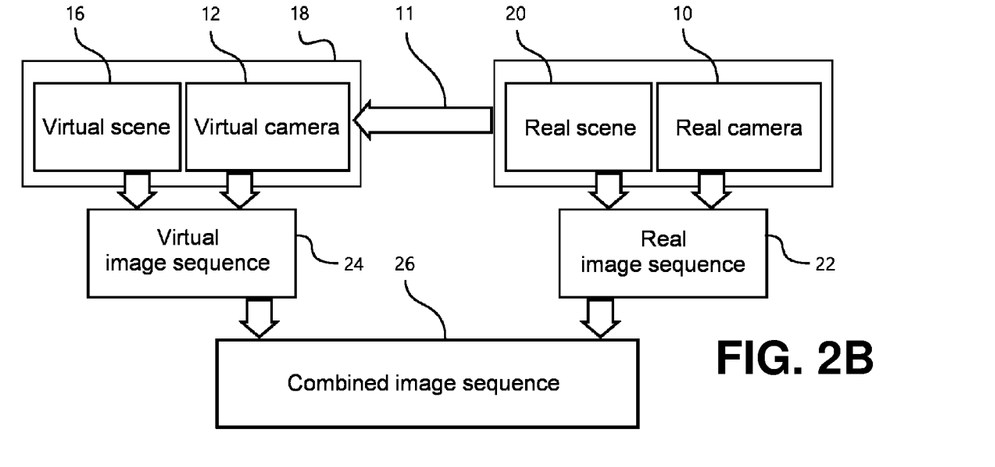
FIG. 2B shows a schematic illustration of the second method.

FIGS. 2A and 2B show a second exemplary embodiment of a method according to the disclosure. For the following exemplary embodiments, identical reference signs are used for identical or comparable features and they will not be explained separately again, in order to avoid repetitions. As in the method described above, the method shown in FIGS. 2A and 2B likewise provides for capturing a first image sequence S21 with a real camera 10. In this case, this method provides for capturing the first image sequence to proceed in an actually existing real scene 20 and to result in a real image sequence 22. As already explained above, in this method, too, the camera settings and camera positions are detected S22 and transmitted to a virtual camera 12 S23.

The information obtained in these steps S21 to S23 is then used, in a further step S24, to generate a second image sequence 24 by a virtual camera 12 within a virtual scene 16 with an image synthesis program 18 taking account of the camera settings and camera positions 11. The information 11 about, for example, the location of the entrance pupil and the field of view of the camera 10 of the real image sequence 22 is already available for the generation of the second, virtual image sequence 24. In one specific application, the first real image sequence 22 could be, for example, a green screen scene during a film capturing. In such a case, for example, position and orientation of the camera 10, focus, aperture, zoom setting can be detected in a temporally resolved manner during the image capturing. This information can then accordingly be used when creating the virtual scene 16 and ultimately when creating the virtual image sequence 24.

In a further step S24, the first, real image sequence 22 and the second, virtual image sequence 24 can be combined to form a composite image sequence 26. In this case, in the aforementioned example of the green screen technique, the virtual image content of the virtual image sequence 24 can be integrated into the image content of the real image sequence 22. An authentic appearance of the composite image sequence 26 results on account of the largely seamless insertion possibility. Moreover, the superimposition/insertion can be effected in a very simple manner.

Figure 3A:
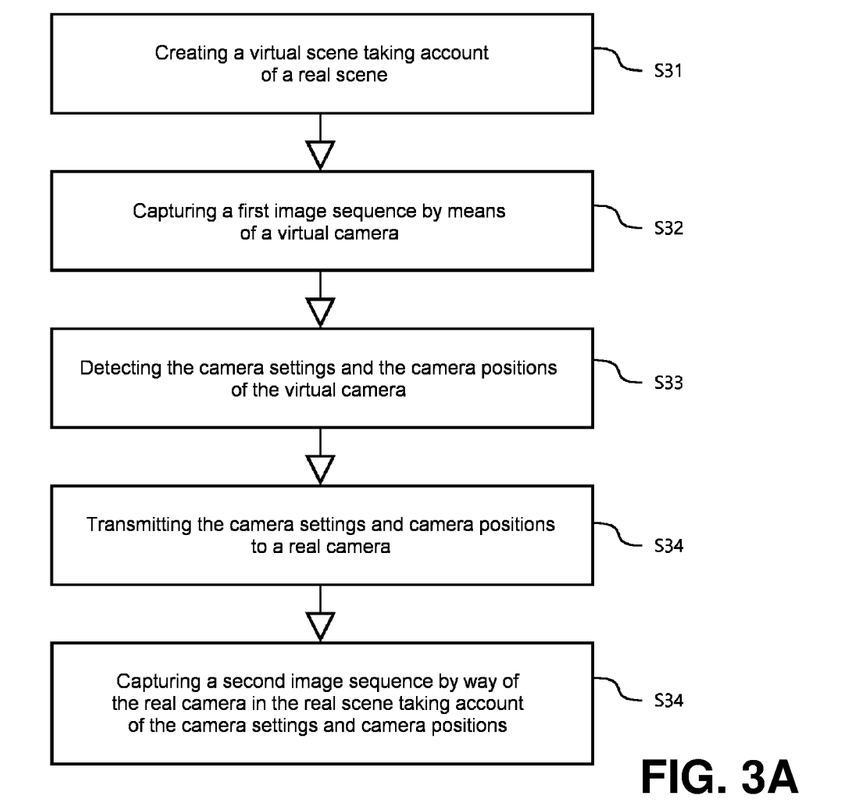
FIG. 3A shows a flow diagram of a third method according to an exemplary embodiment of the disclosure.
Figure 3B:
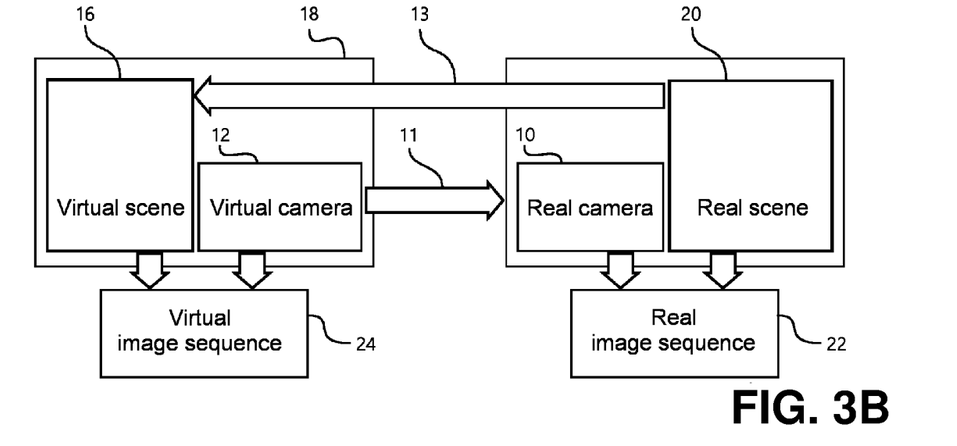
FIG. 3B shows a schematic illustration of the third method.

A further exemplary embodiment of the method according to the disclosure is illustrated in FIGS. 3A and 3B. A first step S31 includes creating a virtual scene 16 taking account of the spatial and other data 13 of a real scene 20. A second step S32 includes capturing a first image sequence 24 with the virtual camera 12. In this case, it is not important in this exemplary embodiment to store said first image sequence 24. Rather, the aim in this exemplary embodiment is to give the cameraman the opportunity to test and plan different settings of the camera prior to actually capturing a real image sequence 22. With a realistic simulation of the real camera 10 by the virtual camera 12, it is possible in this way to plan and try out different camera settings and camera positions for example also in regard to artistic aspects and technical implementability.

Accordingly, a further step S33 includes detecting the camera settings and the camera positions of the virtual camera 12. This is typically done in a temporally resolved manner, i.e., a time stamp is assigned to each detected camera setting and camera position. Typically, the settings and positions are detected for each individual image of the individual image sequence. Depending on the configuration, however, the detection frequency can also be adapted to the conditions. In this regard, by way of example, a lower frequency than for every image can be provided. In this case, the frequency can be settable to a fixed frequency—every n-th image—or be adaptable depending on alterations taking place. The detected settings can includes, for example, position, direction, focus, aperture or zoom setting. The information thus detected can then be used to plan the set and camera shooting.

Optionally, in a further step S34, the camera settings and camera positions thus detected can be transmitted to a real camera 10. These settings can then be taken into account during the real capturings of the second series of individual images. By way of example, the camera settings can be played back as a setting sequence during the capturing in the real camera 20, with the result that the burden on the cameraman is relieved and he has to attend to fewer capturing details during the capturing.

Figure 4:
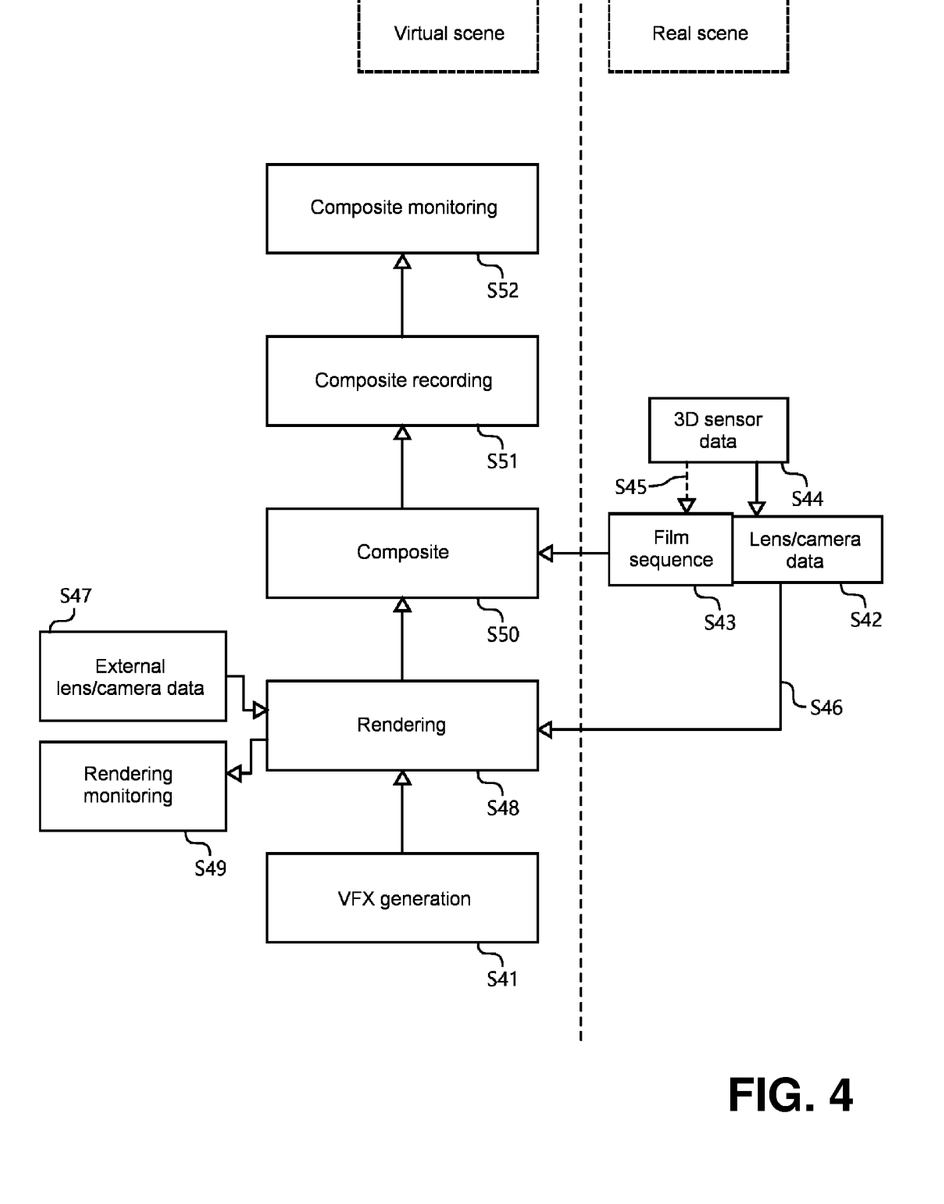
FIG. 4 shows a schematic illustration of a fourth method according to an exemplary embodiment of the disclosure.

A further exemplary embodiment of the method according to the disclosure is illustrated in FIG. 4. The method as described in FIG. 4 provides, with steps S41 and S42, two method steps that can take place temporally independently of one another.

Step S41 produces an initial basis for subsequent rendering, referred to here as VFX generation. The initial basis can be for example the data of a virtual scene containing the necessary three-dimensional information.

It is also possible to use any other basis that makes it possible, from three-dimensional information, to carry out rendering in such a way that a series of individual images arises. By way of example, this can also already involve a preprocessed two-dimensional image with additional depth information or a two-dimensional image in which a 3D position in a three-dimensional scene is assigned to each image point. In this case, the 3D information can be integrated into the two-dimensional image, can be predefined with regard to the represented scene, can be emulated for the represented scene or can be generated for the represented scene, for example on the basis of three-dimensional data acquired by the represented real scene being detected with 3D sensors, for example.

Step S42 includes capturing lens/camera data, which are assignable to a series of individual images (frames of a film sequence). The detection can relate to a lens of a camera, for example, and can be effected with the lens, for example.

Typically, detecting a film sequence S43 can be effected at the same time as detecting the lens/camera data S42.

The lens/camera data can include a series of lens data, wherein the series has for example a respective set of lens/camera data for the individual image (frame). Alternatively or additionally, lens/camera data assignable only to the entire series of individual images (film sequence) can be detected.

The lens/camera data can include for example information about possible properties and/or settings of the lens itself such as, for example, an identification of the lens type or of the individual lens, information about the kind of lens, the focal length of the lens, a calibrated focal distance, a calibrated T-stop value, a depth of field, a hyperfocal distance, a horizontal image angle or the position and/or size of the entrance pupil. These lens/camera data can be captured for example by a real camera or a real lens during the recording of a first series of individual images (film sequence). The lens/camera data can be ascertained/calculated and/or recorded for example for each focal point and each effective T-stop value and/or for each individual image (frame).

Alternatively or additionally, the lens/camera data can include specific physical data that characterize one or more, typically all, optical elements such as, for example, lens elements, stops and/or filters in the lens. Said physical data can be for example the shape of the lens element, the aperture of the element, the maximum aperture for example of a lens (smallest f-number), the spectral transmittance and the like. Generally, the specific physical data can be such data which allow a conclusion to be drawn about the optical design of the lens and thus a calculation of the imaging properties and/or an implementation of a method using ray tracing, ray casting, a point spread function or an optical transfer function.

Additionally or alternatively, the lens/camera data can include information about the three-dimensional structure of the scene filmed in reality. The detection of these 3D data S44 can be effected for example in parallel with the detection of the properties and/or settings of the lens S42.

The 3D data can be integrated into the lens/camera data. Alternatively or additionally, the 3D data can also be added to the film sequence data S45.

The 3D data can be detected for example using one or more 3D sensors which, by way of optical or acoustic scanning of the filmed scene, for example, generate spatial data that can be assigned to the filmed series of individual images (film sequence). The sensor(s) can be arranged for example separately from the lens or the camera. Typically, the sensor(s) is/are situated on the camera or the lens or is/are integrated into the camera or the lens.

Alternatively or additionally, the lens/camera data can include position, location and/or movement data that are additionally recorded in a temporally resolved manner, that is to say assignable for example to the individual images (frames) of the series of individual images (film sequence). The position, location and/or movement information makes it possible to determine the position of the camera and/or of the lens in relation to the filmed real scene and the orientation of the camera and/or of the lens in relation to the filmed scene. A temporally resolved detection enables information about the movement of the camera and/or of the lens also to be detected or derived directly or indirectly. In this regard, movements of the camera and/or of the lens can be derived for example from the alteration of the location or of the position. Alternatively or additionally, it is possible to use sensors that directly detect a movement of the camera/lens, such as gyro sensors, for example.

In summary, the lens/camera data can include lens-specific data, 3D data of the real scene and/or position/location/movement data.

Provision can be made for these lens/camera data to be processed further and made available for rendering as early as during recording in real time S46.

Alternatively or additionally, the lens/camera data can be recorded and only be used in a subsequent further processing step carried out temporally downstream of recording S47.

Step S48 involves rendering, i.e., generating a two-dimensional image on the basis of three-dimensional data.

The lens/camera data S46 and S47 can be taken into account during rendering.

Rendering can be carried out using an algorithm that employs one or more of the following methods: ray tracing (ray function), ray casting, a point spread function, and/or an optical transfer function.

Alternatively or additionally, it is possible—as already explained above—when generating the two-dimensional image to use an already preprocessed two-dimensional image with depth information or a two-dimensional image with integrated three-dimensional information. Rendering can also constitute only correcting an already existing two-dimensional image on the basis of the lens/camera data.

With the use of the lens/camera data, it is possible to impart to the rendered individual image (frame) or the series of individual images (film sequence) an appearance that gives the impression as though it had been captured by the lens/camera associated with the lens/camera data.

In this case, the lens/camera data can be used for rendering in real time during the capturing of the lens/camera data. In this case, the lens/camera data can be made available to the rendering process in real time S46, for example with a wireless or wired transmission of the lens/camera data to a rendering computer, and be used for rendering.

Alternatively or additionally, provision can be made for lens/camera data that had already been captured previously to be used for rendering S47.

In this case, provision can be made for the lens/camera data to contain for example only lens-specific and/or lens-element-specific data that are not temporally resolved.

Alternatively or additionally, the lens/camera data can include for example only position and/or location and/or movement data.

In one exemplary embodiment, it is also possible to use different lens/camera data in combination during rendering. By way of example, non-temporally resolved lens-specific and/or lens-element-specific data of a first lens can be combined with position and/or location and/or movement data of a second lens/second camera. In this regard, by way of example, a film sequence filmed with a first lens can supply position and/or location and/or movement data for rendering with the lens-specific and/or lens-element-specific data of a second lens. In this regard, it is possible to give the impression as though a film sequence had been filmed using a different lens. In this case, rendering can be effected in real time or take place in a downstream step.

Rendering can generate for example film sequences with a resolution of 2K in real time at a frame rate of 24 fps. With increasing computing power, resolutions in 4K or 8K with the stated frame rate are also possible.

The rendered film sequences can be displayed in a viewable manner on a rendering monitor S49 during or after generation S44.

The first series of individual images (first film sequence) thus rendered with inclusion of the lens/camera data can be combined with a really filmed second series of individual images (second film sequence) in a subsequent step S50 ("Composite"). If the first film sequence has been rendered or corrected with the lens/camera data with which the second film sequence has been filmed, it is possible to combine the two film sequences in a simple manner without a break.

The film sequences combined into one film sequence can be recorded S51 and displayed in a viewable manner on a composite monitor S52.

It is understood that the foregoing description is that of the exemplary embodiments of the disclosure and that various changes and modifications may be made thereto without departing from the spirit and scope of the disclosure as defined in the appended claims.

What is claimed is:

1. A method for creating a second series of individual images with a first series of individual images, wherein individual images of the first or the second series of individual images were recorded with a lens, the method comprising:
    determining properties of a light ray within the lens for the individual images of the first series of individual images; and
    creating or adapting the individual images of the second series of individual images by taking account of properties of the light ray within the lens of a respective individual image of the first series of individual images,
    wherein determining properties of the light ray is effected for a first lens, and
    wherein creating or adapting the individual images of the second series of individual images is effected by additionally taking account of the properties of a light ray within a second lens.

2. The method as claimed in claim 1, wherein determining properties of the light ray within the lens comprises determining an entrance pupil and a field of view of the lens for the individual images of the first series of individual images; and/or
    wherein creating or adapting the individual images of the second series of individual images is effected taking account of the entrance pupil and the field of view of the lens of the respective individual image of the first series of individual images.

3. The method as claimed in claim 2, wherein creating or adapting comprises performing a point spread function and/or an optical transfer function and/or a ray function.

4. The method as claimed in claim 1, further comprising:
    combining an image content of the first series of individual images and the image content of the second series of individual images, wherein the combining comprises adapting the image content of the individual images of the second series of individual images to the image content of the individual images of the first series of individual images or creating the individual images of the second series of individual images, in each case taking account of an entrance pupil and a field of view of the lens of the respective individual image of the first series of individual images.

5. The method as claimed in claim 4, wherein adapting or creating the individual images comprises:
    besides taking account of the entrance pupil and the field of view, taking account of at least one of a position of an exit pupil, a depth of field, vignetting, a distortion, a bokeh, a chromatic aberration, a focus, a position of lens elements within the lens, an aperture, an exposure duration, a color appearance, and a reflection within the lens.

6. The method as claimed in claim 1, wherein creating the individual images of the second series of individual images comprises creating the individual images with rendering a virtual scene.

7. The method as claimed in claim 1, wherein adapting the individual images of the second series of individual images is preceded by creating the individual images of the second series with the lens for a camera.

8. The method as claimed in claim 1, wherein:
    determining properties of the light ray comprises recording one or more imaging parameters of the lens during capturing of the first series of individual images; and
    adapting or creating the individual images of the second series of individual images comprises adapting or creating the individual images of the second series of individual images with imaging parameters.

9. The method as claimed in claim 8, wherein the individual images of the second series of individual images are created with the imaging parameters of the lens in real time.

10. The method as claimed in claim 1, wherein determining properties of the light ray comprises recording a temporal series of imaging parameters.

11. The method as claimed in claim 10, further comprising at least one of:
    planning a capturing of the first series of individual images based on the recording of the temporal series of imaging parameters; and
    capturing the first series of individual images with the recording of the temporal series of imaging parameters.

12. The method as claimed in claim 1, wherein the method is provided to be performed in at least one of cinematography, photography, computer games, medical imaging, security applications, face recognition, computer-based simulations, virtual reality, and industrial metrology.

13. A data processing system comprising means for carrying out the method as claimed in claim 1.

14. A non-transitory computer-readable storage medium encoded with a computer program comprising instructions which, when executed on a data processing system, cause the data processing system to:
    determine properties of a light ray within a lens by determining a size, a shape, and/or a location of an exit pupil of the lens for a predetermined group of image points;
    input an object space function;
    create a point spread function and/or input an optical transfer function and/or create a ray function; and
    create or adapt an image by taking account of the properties of the light ray,
    wherein the properties of the light ray are determined for a first lens, and
    wherein the image is created or adapted by additionally taking account of the properties of a light ray within a second lens.

* * * * *